United States Patent
Lee et al.

(10) Patent No.: US 9,301,263 B2
(45) Date of Patent: *Mar. 29, 2016

(54) METHOD FOR DETERMINING TRANSMISSION POWER IN MIMO SYSTEM BASED ON COOPERATIVE TRANSMISSION

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Byung Moo Lee, Seoul (KR); Jin Kyu Kang, Incheon (KR); Joon Hyuk Kang, Daejeon (KR); Nam Jeong Lee, Daejeon (KR); Byung Chang Kang, Yongin-si (KR); Jong Ho Bang, Suwon-si (KR); Jin Hyeock Choi, Suwon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,634

(22) Filed: Jun. 16, 2015

(65) Prior Publication Data

US 2015/0282098 A1     Oct. 1, 2015

Related U.S. Application Data

(63) Continuation of application No. 13/756,896, filed on Feb. 1, 2013, now Pat. No. 9,078,226.

(30) Foreign Application Priority Data

Mar. 13, 2012   (KR) .................. 10-2012-0025800

(51) Int. Cl.
*H04W 52/00*   (2009.01)
*H04W 52/24*   (2009.01)
*H04W 52/42*   (2009.01)
*H04B 7/04*   (2006.01)
*H04W 52/30*   (2009.01)
*H04W 72/04*   (2009.01)
*H04W 52/12*   (2009.01)
*H04W 52/36*   (2009.01)
*H04W 52/46*   (2009.01)

(52) U.S. Cl.
CPC ............ *H04W 52/24* (2013.01); *H04B 7/0413* (2013.01); *H04W 52/30* (2013.01); *H04W 52/42* (2013.01);
(Continued)

(58) Field of Classification Search
CPC .............................. H04W 52/42; H04W 52/12
USPC .......... 455/522, 69, 452.2, 447, 452.1, 67.11, 455/67.13, 63.1; 370/312
See application file for complete search history.

(56) References Cited

U.S. PATENT DOCUMENTS

| 7,526,036 B2 | 4/2009 | Mehta et al. |
| 2008/0310523 A1 | 12/2008 | Hui et al. |

(Continued)

FOREIGN PATENT DOCUMENTS

| KR | 10-2006-0135155 A | 12/2006 |
| KR | 10-2008-0024815 A | 3/2008 |

(Continued)

*Primary Examiner* — John J Lee
(74) *Attorney, Agent, or Firm* — NSIP Law (57) ABSTRACT

A method for determining a transmission power in a multi-input multi-output (MIMO) system based on a cooperative transmission is provided. The method includes setting a power constraint condition of a transmitter and target quality information of a receiver. The method further includes determining the transmission power to be allocated to the transmitter to transmit the data to the receiver based on the power constraint condition and the target quality information.

16 Claims, 6 Drawing Sheets

(52) U.S. Cl.
CPC ............ *H04W 72/046* (2013.01); *H04W 52/12* (2013.01); *H04W 52/367* (2013.01); *H04W 52/46* (2013.01); *Y02B 60/50* (2013.01)

(56) References Cited

U.S. PATENT DOCUMENTS

| | | | |
|---|---|---|---|
| 2009/0318183 A1 | 12/2009 | Hugl et al. | |
| 2010/0261498 A1* | 10/2010 | Ko et al. | 455/522 |
| 2012/0027108 A1* | 2/2012 | Hong et al. | 375/260 |
| 2013/0114498 A1* | 5/2013 | Park et al. | 370/312 |

FOREIGN PATENT DOCUMENTS

| | | |
|---|---|---|
| KR | 10-0920696 B1 | 10/2009 |
| KR | 10-2010-0035397 A | 4/2010 |
| KR | 10-2010-0057177 A | 5/2010 |
| KR | 10-2010-0063007 A | 6/2010 |
| KR | 10-2010-0138260 A | 12/2010 |
| KR | 10-2011-0004237 A | 1/2011 |
| KR | 10-2011-0020352 A | 3/2011 |

\* cited by examiner

METHOD FOR DETERMINING TRANSMISSION POWER IN MIMO SYSTEM BASED ON COOPERATIVE TRANSMISSION

CROSS-REFERENCE TO RELATED APPLICATION(S)

This application is a continuation of U.S. application Ser. No. 13/756,896 filed Feb. 1, 2013, which claims the benefit under 35 U.S.C. §119(a) of Korean Patent Application No. 10-2012-0025800, filed on Mar. 13, 2012, in the Korean Intellectual Property Office, the entire disclosure of which is incorporated herein by reference for all purposes.

BACKGROUND

1. Field

The following description relates to a method for determining a transmission power in a multi-input multi-output (MIMO) system based on a cooperative transmission.

2. Description of Related Art

A MIMO system includes a plurality of antennas in a transmitter or a receiver to achieve a high gain. A transmission power used by the transmitter included in the MIMO system decreases proportionally to an increase in a number of antennas of the transmitter. Such a relationship is contrary to the fact that a signal-to-noise ratio (SNR) increases based on the increase in the number of the antennas.

Therefore, when the number of antennas of the transmitter is considerably increased, a reduction gain of the transmission power that meets a quality-of-service (QoS) of the receiver may be maximized. The aforementioned system may be defined as a massive MIMO system.

For efficient use of limited frequency resources, all wireless communication standards related to a base station-mobile phone communication define that cells communicate by sharing the same frequency. However, due to the cells sharing the same frequency, an inter-cell interference (ICI) may be caused, thereby limiting a capacity of the cells.

Accordingly, a cooperative MIMO system has been suggested, which supports a multi-user (MU) by cooperation among transmitters of respective adjacent cells. The transmitters are interconnected by a high-speed fiber-optic cable. Channel information of users of the respective adjacent cells and transmitted data are exchanged through the fiber-optic cable. Since the transmitters transmit data to a receiver by cooperating based on the exchanged information, the ICI may be effectively reduced, and the entire capacity of the system may be increased. Furthermore, the cooperation among the transmitters may be effective in view of a power gain, a channel gain, and the like. Therefore, the cooperative MIMO system has been used for coverage expansion by increasing a capacity of cell-edge users in the international mobile telecommunications-advanced (IMT-Advanced).

In the cooperative MIMO system, cooperative communication beamforming and power allocation of a transmitter are performed under an available power constraint. The available power constraint may be divided into two types, that is, a pooled-power constraint and a per-base power constraint. The pooled-power constraint enables transmitters participating in a cooperative transmission to freely share a total available power. The per-base power constraint limits a maximum power of each transmitter participating in the cooperative transmission.

However, when the power allocation is performed based on the pooled-power constraint, the transmitters may use an excessively high amount of power, thereby affecting adjacent cells with a high interference. Therefore, the per-base constraint has been used.

A beamforming scheme and a power allocation scheme that reduce a transmission power have been applied to a MU-MIMO system. However, an optimal beamforming scheme that minimizes a transmission power of a transmitter while meeting a QoS of each receiver in a multi cell environment, and a power allocation scheme for each beamforming, are needed.

SUMMARY

In one general aspect, there is provided a transmission power determination method for each of transmitters in a multi-input multi-output (MIMO) system in which the transmitters transmit data to receivers, the transmission power determination method including setting a power constraint condition of a transmitter and target quality information of a receiver. The transmission power determination method further includes determining a transmission power to be allocated to the transmitter to transmit the data to the receiver based on the power constraint condition and the target quality information.

In another general aspect, there is provided a transmission power determination method for each of transmitters in a multi-input multi-output (MIMO) system in which the transmitters transmit data to receivers, the transmission power determination method including setting a maximum power available in a transmitter. The transmission power determination method further includes setting target quality information of a receiver, and determining a transmission power to be allocated to the transmitter to transmit the data to the receiver based on the maximum power and the target quality information.

In still another general aspect, there is provided a transmission power determination method for each of transmitters in a multi-input multi-output (MIMO) system in which the transmitters transmits data to receivers, the transmission power determination method including setting a zero-forcing (ZF) beamforming vector associated with a receiver. The transmission power determination method further includes determining a transmission power to be allocated to a transmitter to transmit the data to the receiver based on the ZF beamforming vector.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

A method of minimizing a transmission power in a multi-input multi-output (MIMO) system based on a cooperative transmission of a communication is described herein. A massive MIMO system is used so that the transmission power is more efficiently reduced. Also, when a large number of antennas are used, and therefore, a signal-to-noise ratio (SNR) is increased, a zero forcing (ZF) beamforming scheme is used, which shows almost equivalent performance to an optimal precoding scheme, so that complexity is not increased by the large number of the antennas.

Figure 1:
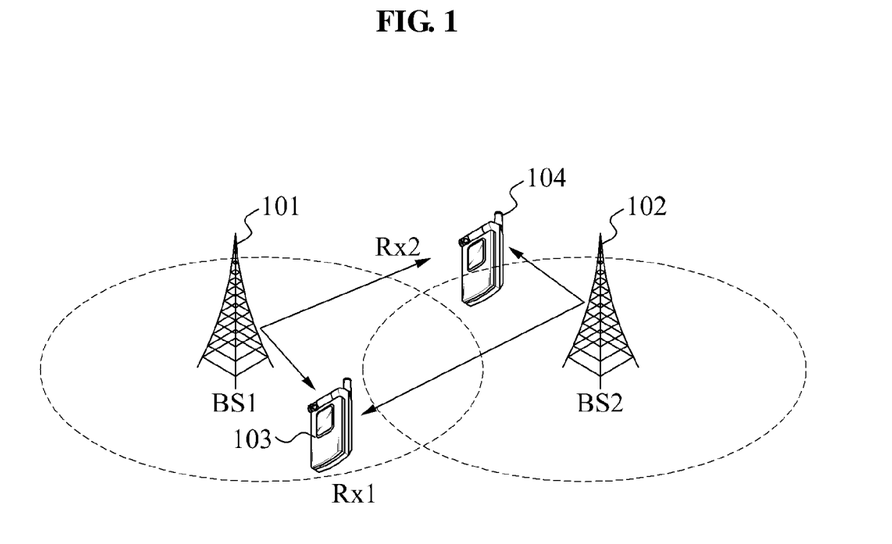
FIG. 1 is a diagram illustrating an example of a cooperative multi-input multi-output (MIMO) system.

FIG. 1 is a diagram illustrating an example of a cooperative MIMO system. Referring to FIG. 1, the cooperative MIMO system includes two transmitters 101 and 102, namely, a base station BS1 and a base station BS2. The cooperative MIMO system further includes two receivers 103 and 104, namely, a receiver Rx1 and a receiver Rx2.

The transmitters 101 and 102 cooperatively communicate with the receivers 103 and 104. However, a number of the transmitters 101 and 102 and a number of the receivers 103 and 104 as described herein are only by way of example, and are not limited thereto. The transmitter as described hereinafter may be a base station (BS), while the receiver as described hereinafter may be a user terminal, although they are not limited thereto.

Channel information and transmission signals among all of the transmitters 101 and 102 and the receivers 103 and 104 in the cooperative MIMO system are completely known, e.g., determined and/or shared. Also, each of the transmitters 101 and 102 includes a number $N_t$ of antennas, while each of the receivers 103 and 104 includes a single antenna. To simplify equations introduced hereinafter, it is presumed that a cooperative transmitter supports two receivers with one frequency resource. However, the numbers of the transmitters 101 and 102 and the number of the receivers 103 and 104 are not limited thereto.

The transmitters 101 and 102 transmit the respective transmission signals based a timing-advanced mechanism technology. Each of the receivers 103 and 104 simultaneously and respectively receives the transmission signals from the transmitters 101 and 102. A received signal of a k-th receiver (k=1, 2) among receivers (e.g., the two receivers 103 and 104) may be expressed by the example of Equation 1:

$$y_k = \sum_{j=1}^{2} h_{kj} w_{kj} \sqrt{p_{kj}} \, x_k + \sum_{k'=1, k' \neq k}^{2} \sum_{j=1}^{2} h_{kj} w_{k'j} \sqrt{p_{k'j}} \, x_{k'} + n_k \quad (1)$$

In Equation 1, $x_k$ denotes a transmission signal transmitted from a j-th transmitter (j =1, 2) among transmitters (e.g., the two transmitters 101 and 102) to the k-th receiver, $w_{kj}$ denotes a beamforming vector executed when the j-th transmitter transmits the transmission signal to the k-th receiver, and $p_{kj}$ denotes a transmission power of the transmission signal. In addition, $n_k$ denotes an additive white Gaussian noise (AWGN) including an average of 0, and $h_{kj}$ denotes a channel vector between the j-th transmitter and the k-th receiver, that is, a complex-number Gaussian vector including an average of 0 and a distribution of 1. All channels between the respective transmitters and the respective receivers are independent and flat.

In a cooperative massive MIMO system, a transmitter determines each beamforming vector and each transmission power to minimize a total transmission power of the transmitters while meeting a target signal-interference-to-noise ratio (SINR) of each receiver and a power constraint condition of each transmitter. The minimization of the total transmission power may be expressed by the example of Equation 2:

$$\min_{w_{kj}, p_{kj} \geq 0 \forall k, j} \sum_{k=1}^{2} \sum_{j=1}^{2} p_{kj} \quad (2)$$

$$\text{s.t } SINR_k \geq \gamma_k, \, 1 \leq k \leq 2$$

$$\sum_{k=1}^{K} p_{kj} \leq \overline{P}_j, \, 1 \leq j \leq 2$$

In Equation 2, $\gamma_k$ denotes a target SINR of the k-th receiver, that is, target quality information of the k-th receiver. $\gamma_k$ may be expressed by a quality of service (QoS) for the transmission signal transmitted from the j-th transmitter to the k-th receiver. $\overline{P}_j$ denotes a transmission power available in the j-th transmitter.

An SINR of the k-th receiver may be expressed by the example of Equation 3:

$$SINR_k = \frac{\left| \sum_{j=1}^{2} h_{kj} w_{kj} \sqrt{p_{kj}} \right|^2}{\left| \sum_{k'=1, k' \neq k}^{2} \sum_{j=1}^{2} h_{kj} w_{k'j} \sqrt{p_{k'j}} \right|^2 + \sigma_n^2}, \, \forall k. \quad (3)$$

In Equation 3, $\sigma_n^2$ denotes a covariance array.

Since the cooperative massive MIMO system includes a large number of antennas, a linear ZF beamforming scheme may be used. Therefore, each transmitter and each receiver execute a linear ZF beamforming vector, which shows almost optimal performance when the large number of the antennas are included in each transmitter.

In more detail, presuming that $W_j$ denotes a linear ZF beamforming matrix including column vectors as beamforming vectors between the j-th transmitter and each of the respective receivers, $W_j = [w_{1j} \, w_{2j}]$ is met. Consequently, the linear ZF beamforming matrix $W_j$ may be expressed by the example of Equation 4:

$$W_j = H_j^H (H_j H_j^H)^{-1} \quad (4)$$

In Equation 4, $H_j$ denotes a channel matrix between the j-th transmitter and all of the receivers. When the linear ZF beamforming matrix $W_j$ is used, interferences among the receivers may be removed. Therefore, the received signal of the k-th receiver in Equation 1 may be expressed by the example of Equation 5:

$$y_k = \sum_{j=1}^{2} \frac{\sqrt{p_{kj}}}{\|w_{kj}\|} x_k + n_k, \forall k \quad (5)$$

Accordingly, Equation 3 may be rearranged in a form of the example of Equation 6:

$$SINR_k = \left| \sum_{j=1}^{2} \frac{\sqrt{p_{kj}}}{\|w_{kj}\|} \right|^2 \quad (6)$$

When Equation 4, Equation 5, and Equation 6 are substituted for Equation 2, Equation 2 related to the minimization of the total transmission power may be expressed by the example of Equation 7:

$$\min_{p \geq 0} \sum_{k=1}^{2} \sum_{j=1}^{2} p_{kj} \quad (7)$$

$$\text{s.t} \left| \sum_{j=1}^{2} \frac{\sqrt{p_{kj}}}{\|w_{kj}\|} \right|^2 \geq \gamma_k, 1 \leq k \leq 2$$

$$\sum_{k=1}^{2} p_{kj} \leq \overline{P}_j, 1 \leq j \leq 2$$

Since each beamforming vector is fixed in Equation 7, a method of distributing each transmission power corresponding to each beamforming vector is needed to minimize the total transmission power. The transmission power distribution method may be divided into two cases based on the beamforming vector $\|w_{ij}\|$ between the j-th transmitter and the k-th receiver, the target SINR $\gamma_k$ of the k-th receiver, and the transmission power $\overline{P}_j$ available in the j-th transmitter.

In case 1, the transmission power $\overline{P}_j$ available in the j-th transmitter is sufficient. That is, the constrained available transmission power $\overline{P}_j$ is sufficient in the j-th transmitter. In other words, a total transmission power to be allocated to the j-th transmitter is less than or equal to the available transmission power $\overline{P}_j$. In case 1, the transmission power to be allocated to the j-th transmitter to transmit data to the k-th receiver may be expressed by the example of Equation 8:

$$p_{kj} = \left( \frac{\sum_{j'=1, j' \neq j}^{2} \|w_{kj'}\|^2 \|w_{kj}\|}{\sum_{i=1}^{2} \|w_{ki}\|^2} \right)^2 \gamma_k, \forall k, j. \quad (8)$$

According to Equation 8, the transmission power $p_{kj}$ may be determined based on the beamforming vector $\|w_{kj}\|$ between the j-th transmitter and the k-th receiver, a beamforming vector between a j'-th transmitter and the k-th receiver, and the target quality information $\gamma_k$.

A condition that derives Equation 8 is that the available transmission power $\overline{P}_j$ is sufficient, namely, the total transmission power to be allocated to the j-th transmitter is less than or equal to the available transmission power $\overline{P}_j$. This may be expressed by the example of Equation 9:

$$\sum_{k=1}^{2} \left( \frac{\sum_{j'=1, j' \neq j}^{2} \|w_{kj'}\|^2 \|w_{kj}\|}{\sum_{i=1}^{2} \|w_{ki}\|^2} \right)^2 \gamma_k \leq \overline{P}_j, \forall j. \quad (9)$$

In case 2, the transmission power $\overline{P}_j$ available in the transmitter is insufficient. In other words, the constrained available transmission power $\overline{P}_j$ is insufficient in the j-th transmitter. That is, the total transmission power to be allocated to the j-th transmitter is greater than the available transmission power $\overline{P}_j$. In case 2, the j-th transmitter totally consumes the available transmission power $\overline{P}_j$, whereas another transmitter of which an available transmission power is sufficient may compensate for the deficiency of the available transmission power $\overline{P}_j$ in the j-th transmitter. Accordingly, a target SINR of each receiver may be met.

Since conditions of case 2 are complicated as aforementioned, it is difficult to find the transmission power distribution method of minimizing the total transmission power. However, considering characteristics of the cooperative massive MIMO system, each transmission power may be efficiently distributed in each respective transmitter.

That is, characteristics of $H_j H_j^H \approx N_t I$ may be derived by applying the law of large numbers to the cooperative massive MIMO system. Accordingly, the linear ZF beamforming matrix becomes $H_j H_j^H \approx N_t I$. Since norm values of the respective channel vectors $h_{kj}$ are almost equal, norm values of all of the beamforming vectors $\|w_{kj}\|$ are almost equal. That is, $\|w_{kj}\| = m, \forall k, j$ is met, in which m denotes a random constant.

When a transmission power available in a $\bar{j}$-th transmitter ($\bar{j} \neq j$) is insufficient, a transmission power to be allocated to the $\bar{j}$-th transmitter to transmit data to the k-th receiver, and the transmission power to be allocated to the j-th transmitter to transmit data to the k-th receiver, may be expressed by the example of Equation 10:

$$p_{k\bar{j}} = \frac{\gamma_k \overline{P}_{\bar{j}}}{\sum_{k'=1}^{2} \gamma_{k'}}, \forall k, \& \quad (10)$$

$$p_{kj} = \|w_{kj}\|^2 \left( \sqrt{\gamma_k} - \frac{\sqrt{p_{k\bar{j}}}}{\|w_{k\bar{j}}\|} \right)^2, \forall k, j (j \neq \bar{j})$$

According to Equation 10, the transmission power $p_{kj}$ may be determined based on the beamforming vector $\|w_{kj}\|$ between the j-th transmitter and the k-th receiver, a beamforming vector $\|w_{k\bar{j}}\|$ between the $\bar{j}$-th transmitter and the k-th receiver, the target quality information $\gamma_k$, and the transmission power $p_{k\bar{j}}$.

Figure 2:
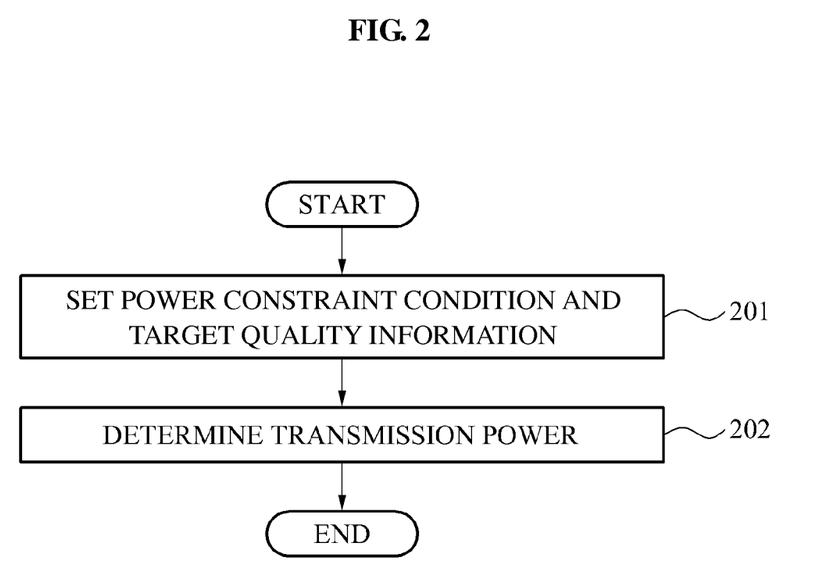
FIG. 2 is a flowchart illustrating an example of a transmission power determination method.
Figure 3:
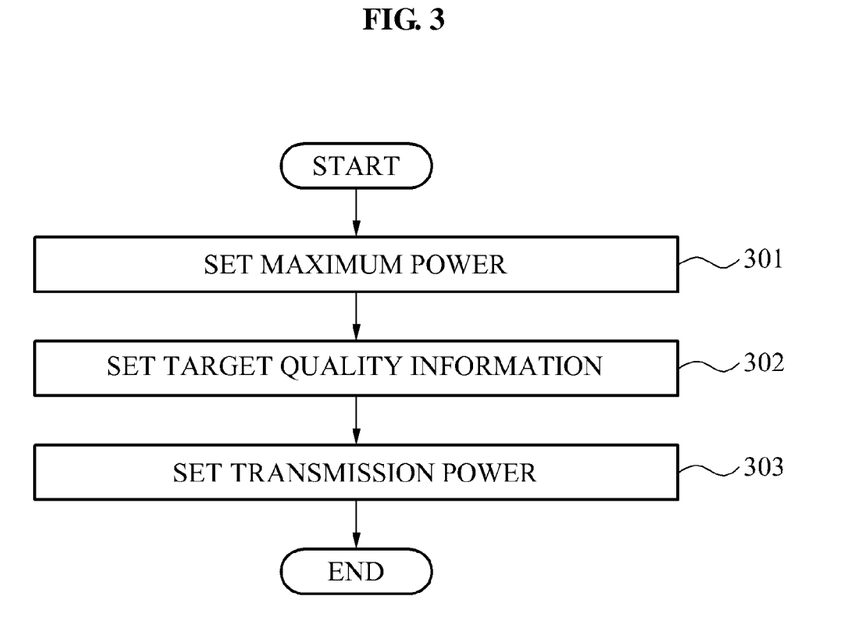
FIG. 3 is a flowchart illustrating another example of a transmission power determination method.
Figure 4:
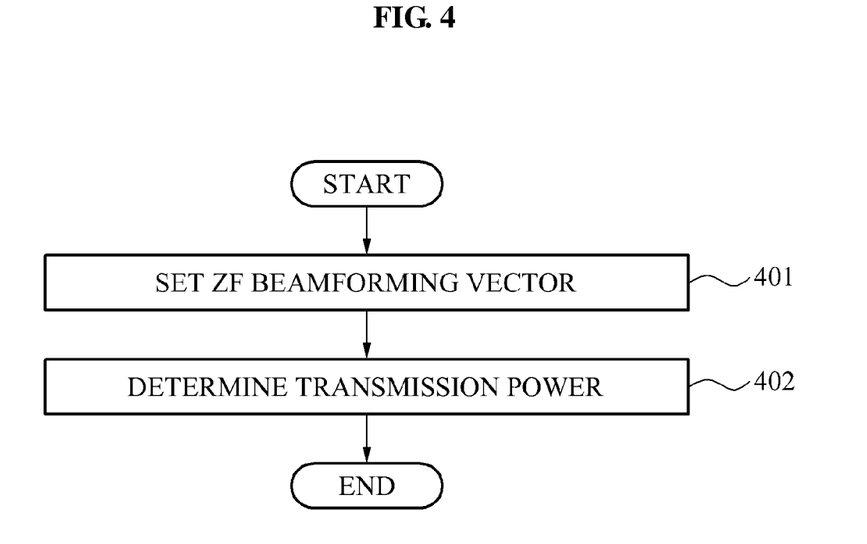
FIG. 4 is a flowchart illustrating still another example of a transmission power determination method.

FIG. 2 is a flowchart illustrating an example of a transmission power determination method. The transmission power determination method that will be described with reference to FIGS. 2 through 4 may be performed by a transmission power determination apparatus. The transmission power determination apparatus may be provided inside or outside of a transmitter, e.g., the transmitter 101 or 102. In FIGS. 2 through 4, a cooperative massive MIMO system includes a plurality of transmitters that cooperatively transmits data to a plurality of receivers.

In operation 201, the transmission power determination apparatus sets a power constraint condition of a j-th transmitter and target quality information of a k-th receiver. The power constraint condition may include a power available in the j-th transmitter. The target quality information may include QoS of a signal to be transmitted from the j-th transmitter to the k-th receiver, and may include a target SINR.

In operation 202, the transmission power determination apparatus determines a transmission power to be allocated to the j-th transmitter that is used to transmit data to the k-th receiver based on the power constraint condition and the target quality information. In more detail, the transmission power determination apparatus may determine a total transmission power to be allocated to the j-th transmitter based on a beamforming vector to be used when the j-th transmitter transmits data to the k-th receiver, a beamforming vector to be used when a j'-th transmitter transmits data to the k-th receiver, and the target quality information. The beamforming vectors may be linear ZF beamforming vectors. In this example, a transmission quality information (e.g., a SINR) of the k-th receiver may be determined based on the beamforming vector to be used when the j-th transmitter transmits data to the k-th receiver and the transmission power to be allocated to the j-th transmitter for the k-th receiver.

The transmission power determination apparatus may determine the transmission power to be allocated to the j-th transmitter for the k-th receiver based on whether the total transmission power to be allocated to the j-th transmitter meets (e.g., is less than or equal to) the power constraint condition of the j-th transmitter. That is, when the total transmission power to be allocated to the j-th transmitter meets the power constraint condition of the j-th transmitter, the transmission power determination apparatus may determine the transmission power to be allocated to the j-th transmitter for the k-th receiver based on the beamforming vector between the j-th transmitter and the k-th receiver, the beamforming vector between the j'-th transmitter and the k-th receiver, and target quality information. In more detail, when the total transmission power to be allocated to the j-th transmitter meets the power constraint condition of the j-th transmitter, the transmission power determination apparatus may determine the transmission power to be allocated to the j-th transmitter for the k-th receiver based on Equation 8.

Conversely, when the total transmission power to be allocated to the j-th transmitter fails to meet (e.g., is greater than) the power constraint condition of the j-th transmitter, the transmission power determination apparatus may determine the transmission power to be allocated to the j-th transmitter for the k-th receiver based on the beamforming vector between the j-th transmitter and the k-th receiver, a beamforming vector between a j̄-th transmitter and the k-th receiver, the target quality information, and a transmission power allocated to the j̄-th transmitter for the k-th receiver. In more detail, when the total transmission power to be allocated to the j-th transmitter fails to meet the power constraint condition of the j-th transmitter, the transmission power determination apparatus may determine the transmission power to be allocated to the j-th transmitter for the k-th receiver based on Equation 10.

The transmission power to be allocated to the j-th transmitter for the k-th receiver may be determined further based on a number of the transmitters, a number of antennas of the j-th transmitter, a number of antennas of the k-th receiver, and a size of a channel generated between the j-th transmitter and the k-th receiver.

FIG. 3 is a flowchart illustrating another example of a transmission power determination method.

In operation 301, a transmission power determination apparatus sets a maximum power available in a j-th transmitter.

In operation 302, the transmission power determination apparatus sets a target quality information of a k-th receiver. The target quality information may include a target SINR.

In operation 303, the transmission power determination apparatus determines a minimum transmission power to be allocated to the j-th transmitter that is used to transmit data to the k-th receiver based on the maximum power and the target quality information. In more detail, the transmission power determination apparatus may determine a total minimum transmission power to be allocated to the j-th transmitter based on a linear ZF beamforming vector to be used when the j-th transmitter transmits the data to the k-th receiver, a linear ZF beamforming vector to be used when a j'-th transmitter transmits data to the k-th receiver, and the target quality information.

The transmission power determination apparatus may determine the minimum transmission power to be allocated to the j-th transmitter for the k-th receiver based on whether the total minimum transmission power to be allocated to the j-th transmitter meets (e.g., is less than or equal to) the maximum power of the j-th transmitter. That is, when the total minimum transmission power to be allocated to the j-th transmitter meets the maximum power of the j-th transmitter, the transmission power determination apparatus may determine the minimum transmission power to be allocated to the j-th transmitter for the k-th receiver based on the linear ZF beamforming vector between the j-th transmitter and the k-th receiver, the linear ZF beamforming vector between the j'-th transmitter and the k-th receiver, and the target quality information. In more detail, when the total minimum transmission power to be allocated to the j-th transmitter meets the maximum power of the j-th transmitter, the transmission power determination apparatus may determine the minimum transmission power to be allocated to the j-th transmitter for the k-th receiver based on Equation 8.

Conversely, when the total minimum transmission power to be allocated to the j-th transmitter fails to meet (e.g., is greater than) the maximum power of the j-th transmitter, the transmission power determination apparatus may determine the minimum transmission power to be allocated to the j-th transmitter for the k-th receiver based on the beamforming vector between the j-th transmitter and the k-th receiver, a beamforming vector between a j̄-th transmitter and the k-th receiver, the target quality information, and a transmission power allocated to the j̄-th transmitter for the k-th receiver. In more detail, when the total minimum transmission power to be allocated to the j-th transmitter fails to meet the maximum power of the j-th transmitter, the transmission power determination apparatus may determine the minimum transmission power to be allocated to the j-th transmitter for the k-th receiver based on Equation 10.

FIG. 4 is a flowchart illustrating still another example of a transmission power determination method.

In operation 401, the transmission power determination apparatus sets a ZF beamforming vector (or ZF beamforming vectors) associated with a k-th receiver.

In operation 402, the transmission power determination apparatus determines a minimum transmission power to be allocated to a j-th transmitter for the k-th receiver based on the ZF beamforming vector. In more detail, the transmission power determination apparatus may determine the minimum transmission power to be allocated to the j-th transmitter for the k-th receiver further based on a comparison between a total minimum transmission power to be allocated to the j-th transmitter and a maximum power available in the j-th transmitter. In addition, the transmission power determination apparatus may determine the minimum transmission power to be allocated to the j-th transmitter for the k-th receiver further based on target quality information (e.g., a target SINR) of the k-th receiver.

Figure 5:
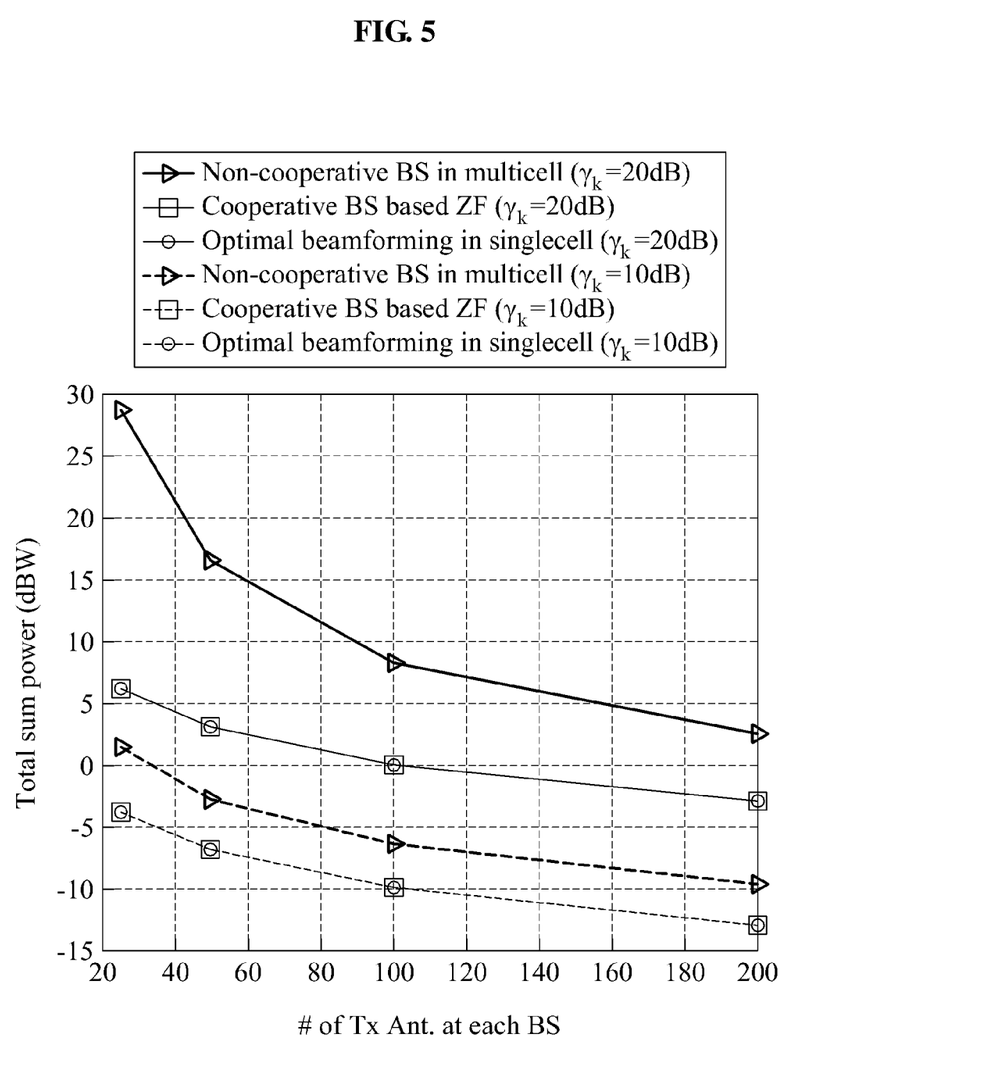
FIG. 5 is a graph illustrating an example of a total transmission power based on a number of antennas of each transmitter.

FIG. 5 is a graph illustrating an example of a total transmission power based on a number of antennas of each transmitter. According to the teachings above, there is provided a transmitter in a cooperative massive MIMO system that minimizes a transmission power while meeting a power constraint condition of the transmitter and a QoS of a receiver in a downlink (DL). In beamforming, the transmitter may use a linear ZF beamforming scheme.

Referring to FIG. 5, a total transmission power of the cooperative massive MIMO system using the linear ZF beamforming scheme is relatively superior to a total transmission power of other systems. In more detail, an x-axis indicates the number of the antennas of each transmitter (e.g., BS), and a y-axis indicates the total transmission power, namely, a total sum of transmission powers used for signal transmission from all transmitters.

FIG. 5 comparatively shows total transmission powers of a non-cooperative multicell system referred to as a 'non-cooperative BS in a multicell', the cooperative massive MIMO (multicell) system using the linear ZF beamforming scheme and referred to as a 'cooperative BS based ZF', and a single-cell system using an optimal ZF beamforming scheme set to an upper bound for comparison of a transmission power minimization effect, and referred to as an 'optimal beamforming in singlecell'. In the following description, a first system refers to the non-cooperative BS in the multicell system, a second system refers to the cooperative BS based ZF, and a third system refers to the optimal beamforming in the singlecell.

A number of antennas in the singlecell system may include a sum of a number of antennas in each transmitter in the multicell system. When a path loss of a channel state is not considered, conditions that constrain an available transmission power of each transmitter in the multicell system are not considered in the singlecell system. That is, the optimal beamforming in the singlecell system may be intuitively set to the upper bound of the cooperative multicell system. Using simulation parameters, target SINRs of each receiver are set to 10 (decibels) (dB) and 20 dB, respectively, and an available transmission power of each transmitter is set to 50 W.

As shown in FIG. 5, as the number of the antennas increases, a difference between the respective total transmission powers of the second system and the third system is almost removed while the target SINR of each receiver increases. When the target SINR of each receiver is infinite, the ZF beamforming schemes are the optimal transmission power allocation methods. Therefore, as the number of the antennas increases, the second system and the third system show almost no difference between them.

However, the third system performs beamforming with a fixed transmission power, redistributes the fixed transmission power in the beamforming, and repeats the foregoing process until the fixed transmission power and the beamforming converge. Accordingly, the second system includes a relatively low complexity, and the third system includes a relatively high. That is, the second system is more efficient.

Figure 6:
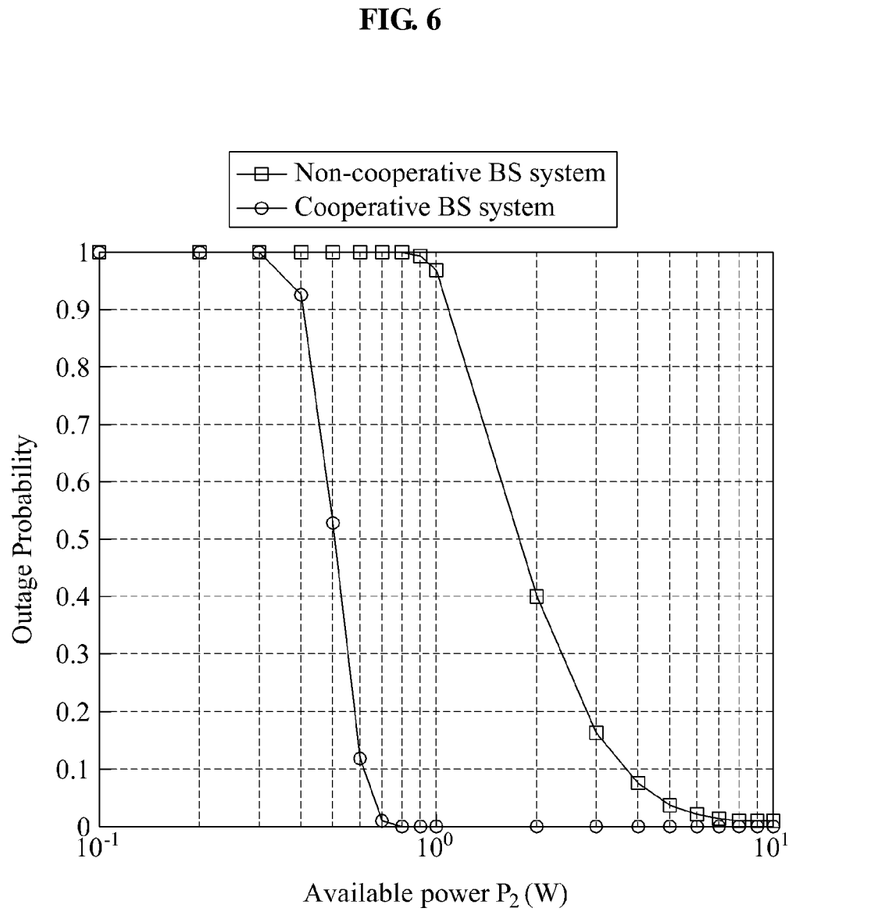
FIG. 6 is a graph illustrating an example an outage probability based on an available transmission power of a transmitter.

FIG. 6 is a graph illustrating an example of an outage probability based on an available transmission power of a transmitter. In more detail, FIG. 6 shows that a cooperative massive MIMO system (e.g., a cooperative BS system) using a linear ZF beamforming is more practicable than other types of systems under a limited condition. An x-axis indicates the available transmission power P2 of the transmitter (e.g., BS) that is unfixed. A y-axis indicates the outage probability, that is, a probability that the ZF beamforming cooperative BS system is impractical under the limited condition. FIG. 6 compares the outage probability between a non-cooperative BS system in a multicell system and the ZF beamforming cooperative BS system when the available transmission power of the transmitter is increased and an available transmission power of each other transmitter is fixed.

The limited condition of the outage probability is that a power constraint condition is not met by any transmitter in the respective system. Simulation parameters define a target SINR of each receiver as 20 dB, a number of antennas of each transmitter as 100, and an available transmission power of each fixed transmitter as 10 W.

As can be appreciated from FIG. 6, the outage probability of the cooperative BS system applying the linear ZF beamforming scheme is approximately 0 at a lower available transmission power than the non-cooperative BS system. That is, the cooperative BS system may meet every power constraint condition at the lower available transmission power. Accordingly, the cooperative BS system is more practicable than the non-cooperative BS system.

According to the teachings above, there is provided a method for determining a transmission power in a multi-input multi-output (MIMO) system based on a cooperative transmission. Accordingly, the transmission power of a transmitter is minimized while meeting a quality of service (QoS) of each receiver and a power constraint condition of the transmitter.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are configured to store and perform program instructions, such as read-only memory (ROM), random access memory (RAM), flash memory, and the like. Examples of program instructions include machine code, such as produced by a compiler, and files including higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for determining transmission power of each of transmitters in a multi-input multi-output (MIMO) system in which the transmitters transmit data to receivers, the apparatus comprising:
   at least one of processors configured to
      set a power constraint condition of a transmitter, and target quality information of a receiver, the target quality information comprising a quality for a signal transmitted to the receiver, and
      determine a transmission power to be allocated to the transmitter to transmit the data to the receiver based on the power constraint condition and the target quality information.

2. The apparatus of claim 1, wherein the at least one of processors is further configured to:
   determine the transmission power to be allocated to the transmitter to transmit the data to the receiver based on a beamforming vector of when the transmitter transmits the data to the receiver.

3. The apparatus of claim 2, wherein the beamforming vector is a zero-forcing (ZF) beamforming vector.

4. The apparatus of claim 1, wherein the at least one of processors is further configured to:
   determine a transmission quality information of the receiver based on a beamforming vector of when the transmitter transmits the data to the receiver and the transmission power to be allocated to the transmitter to transmit the data to the receiver.

5. The apparatus of claim 1, wherein the at least one of processors is further configured to:
   determine a total transmission power to be allocated to the transmitter, and
   determine the transmission power to be allocated to the transmitter to transmit the data to the receiver based on whether the total transmission power to be allocated to the transmitter meets the power constraint condition.

6. The apparatus of claim 5, wherein the at least one of processors is further configured to:
   determine the transmission power to be allocated to the transmitter to transmit the data to the receiver based on a beamforming vector of when the transmitter transmits the data to the receiver, a beamforming vector of when another transmitter transmits the data to the receiver, and the target quality information, when the total transmission power to be allocated to the transmitter meets the power constraint condition.

7. The apparatus of claim 5, wherein the at least one of processors is further configured to:
   determine the transmission power to be allocated to the transmitter to transmit the data to the receiver based on a beamforming vector of when the transmitter transmits the data to the receiver, a beamforming vector of when another transmitter transmits the data to the receiver, the target quality information, and a transmission power allocated to the other transmitter to transmit the data to the receiver, when the total transmission power to be allocated to the transmitter does not meet the power constraint condition.

8. The apparatus of claim 5, wherein the at least one of processors is further configured to:
   determine the total transmission power to be allocated to the transmitter based on a beamforming vector of when the transmitter transmits the data to the receiver, a beamforming vector of when another transmitter transmits the data to the receiver, and the target quality information.

9. The apparatus of claim 1, wherein:
   the power constraint condition comprises a power available in the transmitter; and
   the target quality information comprises a target signal-interference-to-noise ratio (SINR) of the receiver.

10. An apparatus for determining transmission power of each of transmitters in a multi-input multi-output (MIMO) system in which the transmitters transmit data to receivers, the apparatus comprising:
    at least one of processors configured to
       set an available transmission power in a transmitter,
       set target quality information of a receiver, the target quality information comprising a quality for a signal transmitted to the receiver, and
       determine a transmission power to be allocated to the transmitter to transmit the data to the receiver based on the available transmission power and the target quality information.

11. The apparatus of claim 10, wherein the at least one of processors is further configured to:
    determine the transmission power to be allocated to the transmitter to transmit the data to the receiver based on a zero-forcing (ZF) beamforming vector of when the transmitter transmits the data to the receiver.

12. The apparatus of claim 10, wherein the at least one of processors is further configured to:
    determine a total transmission power to be allocated to the transmitter, and
    determine the transmission power to be allocated to the transmitter to transmit the data to the receiver based on a beamforming vector of when the transmitter transmits the data to the receiver, a beamforming vector of when another transmitter transmits the data to the receiver, and the target quality information, when the total transmission power to be allocated to the transmitter is less than or equal to the available transmission power.

13. The apparatus of claim 10, wherein the at least one of processors is further configured to:
    determine a total transmission power to be allocated to the transmitter, and
    determine the transmission power to be allocated to the transmitter to transmit the data to the receiver based on a beamforming vector of when the transmitter transmits the data to the receiver, a beamforming vector of when another transmitter transmits the data to the receiver, the target quality information, and a transmission power allocated to the other transmitter to transmit the data to the receiver, when the total transmission power to be allocated to the transmitter is greater than the available transmission power.

14. The apparatus of claim 10, wherein the available transmission power to the transmitter is determined based on a maximum power in the transmitter.

15. An apparatus for determining transmission power of each of transmitters in a multi-input multi-output (MIMO) system in which the transmitters transmit data to receivers, the apparatus comprising:
   at least one of processors configured to
   set a zero-forcing (ZF) beamforming vector associated with a receiver, and target quality information of a receiver, the target quality information comprising a quality for a signal transmitted to the receiver, and
   determine a transmission power to be allocated to a transmitter to transmit the data to the receiver based on the ZF beamforming vector and the target quality information.

16. The apparatus of claim 15, wherein the at least one of processors is further configured to:
   determine a total transmission power to be allocated to the transmitter,
   compare the total transmission power to be allocated to the transmitter with a available transmission power to the transmitter, and
   determine the transmission power to be allocated to a transmitter to transmit the data to the receiver based on the comparing.

* * * * *